No. 875,542. PATENTED DEC. 31, 1907.
C. W. LURTEY.
TIRE VALVE STEM PROTECTOR.
APPLICATION FILED MAY 15, 1906.

Charles W. Lurtey, Inventor,

Witnesses

By

Attorney

UNITED STATES PATENT OFFICE.

CHARLES W. LURTEY, OF LITTLE ROCK, ARKANSAS.

TIRE-VALVE-STEM PROTECTOR.

No. 875,542.      Specification of Letters Patent.      Patented Dec. 31, 1907.

Application filed May 15, 1906. Serial No. 316,900.

*To all whom it may concern:*

Be it known that I, CHARLES W. LURTEY, a citizen of the United States, residing at Little Rock, in the county of Pulaski and State of Arkansas, have invented a new and useful Tire-Valve-Stem Protector, of which the following is a specification.

This invention relates to means for protecting the valve stems from being cut or torn off in case the tire creeps on the rim of the wheel. It is a well known fact that tires often become loose on the rim, and consequently move with respect thereto. As the valve stems pass through openings in the wheel rims, the result is that the stems are cut, allowing the escape of air, and necessitating repairs to the tire.

The principal object of the present case is to provide a novel and exceedingly simple article of manufacture that may be employed in connection with the ordinary tire and valve stem, and will, to a very material degree, reduce the danger of cutting the same, in case the tire creeps upon the rim.

The preferred embodiment of the invention is illustrated in the accompanying drawings, wherein:—

Figure 1:
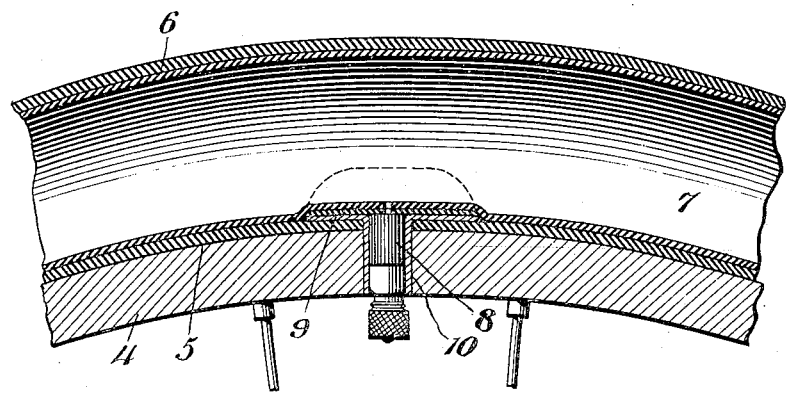
Figure 2:
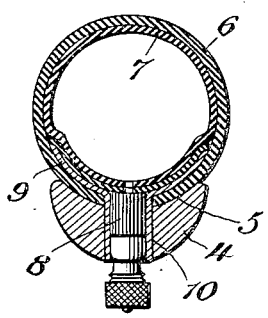
Figure 3:
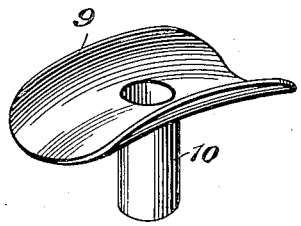

Figure 1 is a longitudinal sectional view, through a portion of a tire and wheel rim, showing the improved protector in place. Fig. 2 is a cross sectional view of the same. Fig. 3 is a detail perspective view of said protector.

Similar reference numerals designate corresponding parts in all the figures of the drawings.

The wheel rim and tire may be of any ordinary or desired construction, a portion of the rim being illustrated at 4, and having a peripheral groove 5, in which the tire is seated. In the present embodiment, the tire comprises an outer casing or section 6, and an inner tube or section 7, the latter carrying a valve stem 8, containing the usual valve mechanism. This valve stem projects through the outer casing or section and through the rim 4 of the wheel, as shown.

The protector comprises a base plate 9 transversely and longitudinally curved to conform to the contour of the tire, and having an open ended sleeve 10, projecting from its central portion. The base plate 9 is located between the casing and tube or sections of the tire, and may be either loosely arranged therein or suitably vulcanized thereto. The sleeve 10 projects from the inner casing, and surrounds the valve stem, said sleeve also passing through the rim 4. It is to be understood that this sleeve does not constitute a part of said valve stem, but is an entirely independent element in the form of a casing that is thus secured to the tire and incloses the stem.

With this arrangement, it will be seen that in case the tire creeps, instead of the flexible valve stem tube coming into contact with the rim of the wheel, the metallic casing or sleeve surrounding the same acts as a guard, and the friction is thus brought against the protector, instead of the valve stem. It will of course be understood that the said protector may be constructed of any desired material, preferably suitable metal, and it will be evident by reference to Fig. 3, that it may be easily and cheaply manufactured. Moreover, it may be employed in connection with tires of different characters, and readily applied to those now in use.

From the foregoing, it is thought that the construction, operation, and many advantages of the herein described invention, will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

The combination with a tire having inner and outer sections, of a valve stem and valve mechanism projecting from the tire, and a stem protector comprising a base plate that is located between the tire sections, said plate being longitudinally and transversely curved, and an open ended sleeve projecting from the base plate and from the tire and surrounding the projecting portion of the valve stem.

In testimony, that I claim the foregoing as my own, I have hereto affixed my signature in the presence of two witnesses.

CHARLES W. LURTEY.

Witnesses:
A. J. MERCER,
SAM. F. ETTINGER.